No. 870,849. PATENTED NOV. 12, 1907.
F. W. RUGGLES.
FEEDING DEVICE FOR POULTRY.
APPLICATION FILED FEB. 16, 1907.
2 SHEETS—SHEET 2.
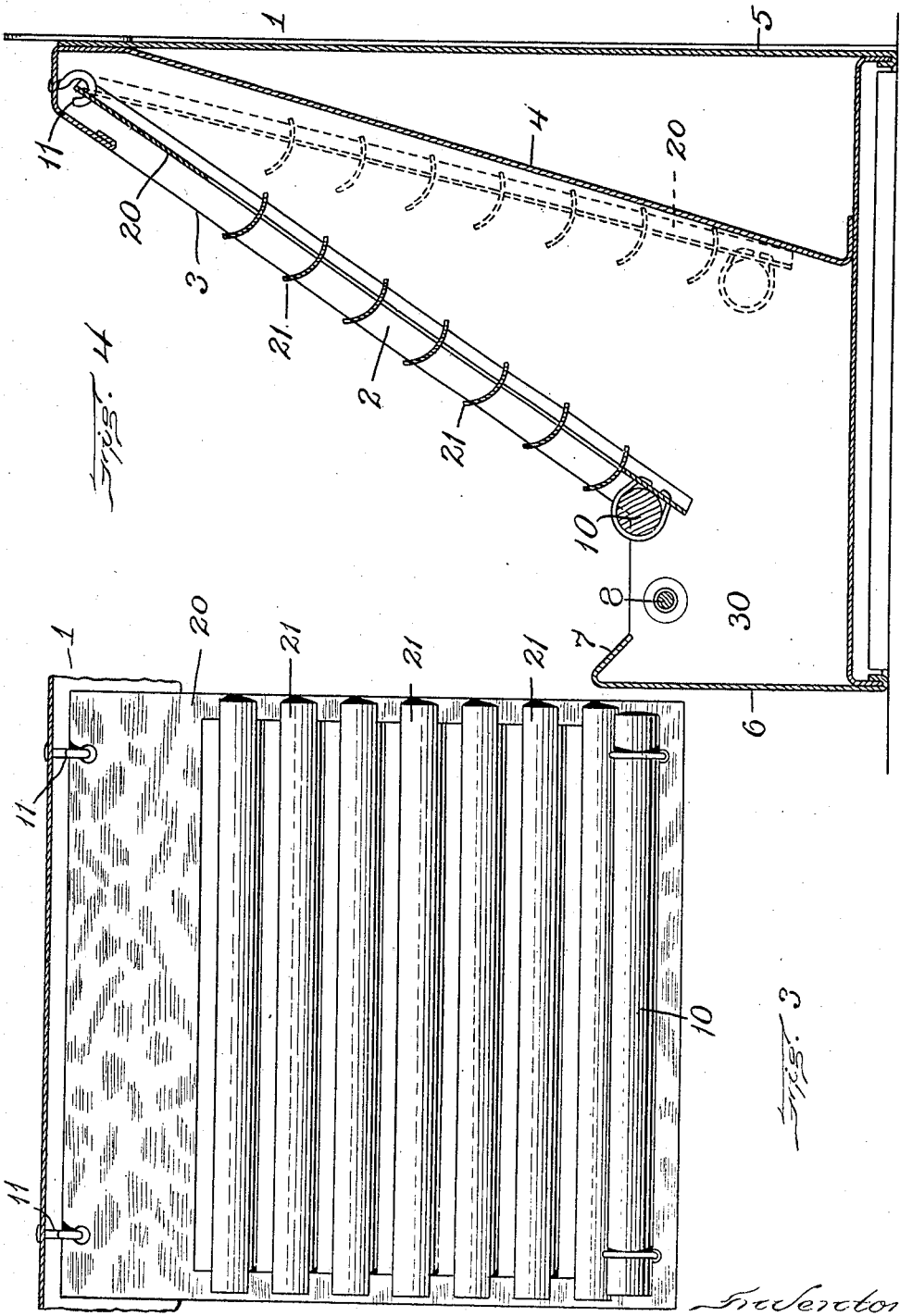

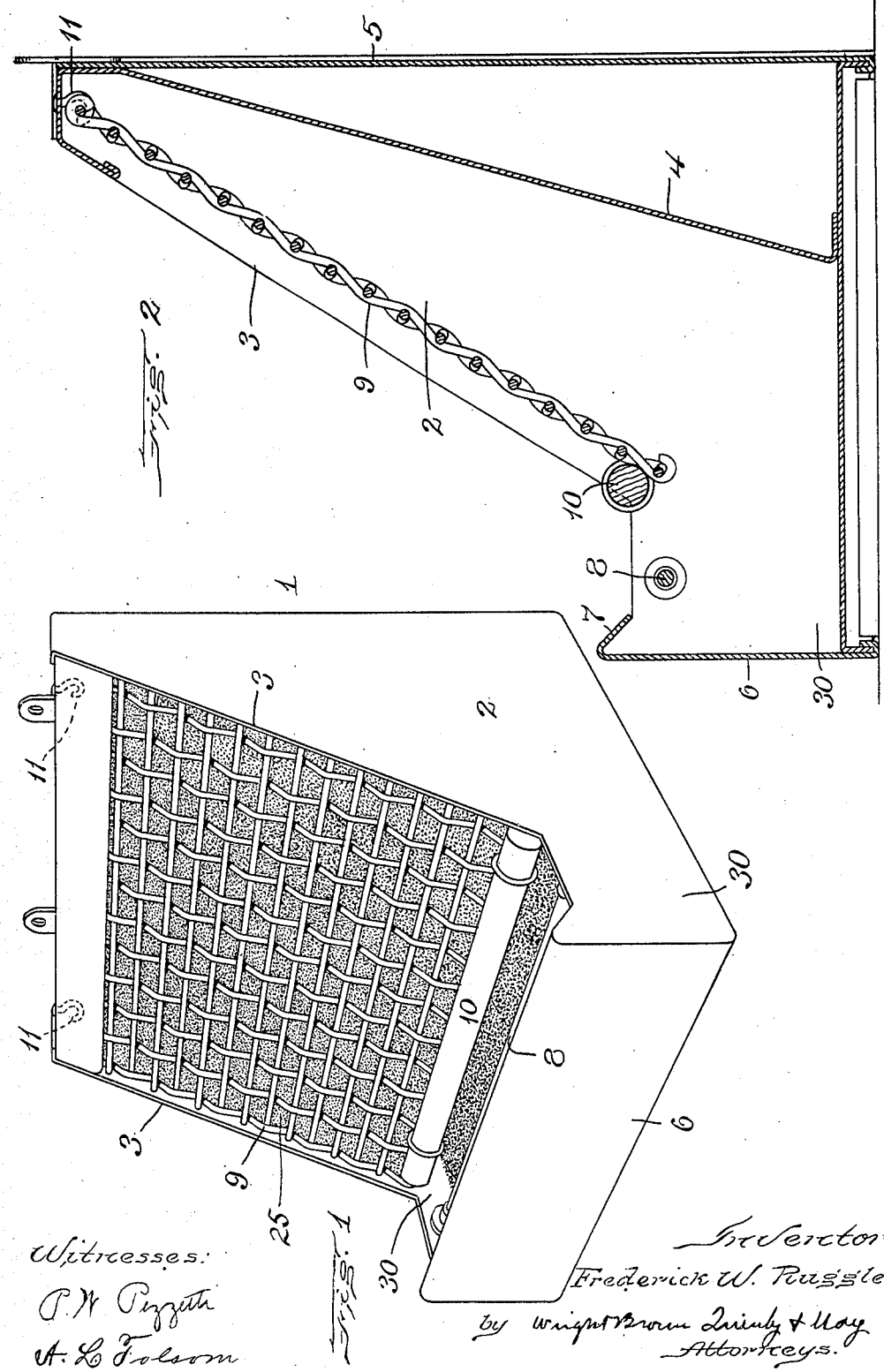

UNITED STATES PATENT OFFICE.

FREDERICK W. RUGGLES, OF HUDSON, MASSACHUSETTS.

FEEDING DEVICE FOR POULTRY.

No. 870,849.

Specification of Letters Patent.

Patented Nov. 12, 1907.

Application filed February 16, 1907. Serial No. 357,603.

*To all whom it may concern:*

Be it known that I, FREDERICK W. RUGGLES, of Hudson, in the county of Middlesex and State of Massachusetts, have invented certain new and useful Improvements in Feeding Devices for Poultry, of which the following is a specification.

This invention relates to a new and improved feeding device for poultry and consists of a feeding device having upon one or more sides a swinging or movable grid, through the spaces of which poultry pick out the grain, the grid receding as the grain is removed and automatically retaining itself against the surface of the grain.

Figure 1 is a perspective view of a poultry feeding device constructed in accordance with my invention, showing a box and its movable grid. Fig. 2 is a vertical sectional view of the feeding device shown in Fig. 1, the grid appearing in its elevated position as shown in Fig. 1, but the supporting grain being removed. Fig. 3 is a front elevation of a modified form of grid, which, instead of being composed of meshes of wire or bars, is composed of parallel or otherwise disposed slats. Fig. 4 is a vertical sectional view of my improved feeding device when equipped with form of grid shown in Fig. 3; in Fig. 4 the grid is shown both in its elevated position as it would be if the box were full of grain, and also in the position it assumes when the grain has been exhausted from back of the grid.

1 represents a box of any suitable dimensions, the sides 2 of which are inclined as at 3. The box preferably is provided with an inclined back 4, which, as shown, may be independent of the back 5 of the box. The back 5 of the box may be a skeleton frame if desired. The sides of the box at the front are extended as at 30, the space between said extension being closed by the front 6, which at the top is turned over to make an inwardly and downwardly inclined lip 7, 8 represents a bar secured to the sides 2 of the box, below and just in front of the edge of the lip 7.

9 represents an open grid made of bars of any suitable material interwoven or otherwise connected together.

10 represents a weight, here shown as a rod connected to the lower end of the grid. The upper end of the grid is connected to hooks 11 or any other preferred means for pivoting the upper end of the grid.

In Figs. 3 and 4, the grid, instead of being composed of wires or rods woven together, is made up of a skeleton frame 20 and a series of slats or bars 21 secured to the sides of the skeleton frame in any preferred way.

In practice, the grid 9, of either or any preferred construction, is swung up, the box laid on its back 5 and then filled with grain 25, thereafter the grid is dropped back onto the grain as shown in Fig. 1. The poultry pick the grain from between the meshes of the form of grid shown in Figs. 1 and 2, or from between slats 21 in the form of grid shown in Figs. 3 and 4. Grain scattered by the bills of the poultry falls down into the bottom of the box from which it may be obtained by the poultry, the bar 8 and lip 7 preventing the scattering of the grain by the poultry as the grain is picked out from the bottom of the box.

Having thus explained the nature of the said invention, and described a way of constructing and using the same, although without attempting to set forth all of the forms in which it may be made, or all of the modes of its use, I declare that what I claim is:

1. A feeding device for poultry, comprising a feed reservoir having a side opening, a movable screen suspended from a point adjacent the upper end of said opening and when in use maintained by the contents of the reservoir as an inclined front of said opening to automatically maintain itself against said contents of the reservoir, and to support said contents upon one side, but permitting the removal of said contents.

2. A feeding device for poultry, comprising a feed reservoir having a side opening, a weighted pivoted screen suspended from a point adjacent the upper end of said opening, and when in use maintained by the contents of the reservoir as an inclined front of said opening to automatically maintain itself against the contents of the reservoir, and to support said contents upon one side, but permitting the removal of said contents.

3. A feeding device for poultry, comprising a feed reservoir, a side opening being formed in said reservoir, a pivoted screen suspended from a point adjacent the upper end of said opening, and when in use maintained by the contents of the reservoir as an inclined front to said opening to automatically maintain itself against the contents of the reservoir, and means upon the front of the opening of said reservoir independent of said screen to prevent the scattering of the grain by the poultry.

In testimony whereof I have affixed my signature, in presence of two witnesses.

FREDERICK W. RUGGLES.

Witnesses:
C. F. BROWN,
A. L. FOLSOM.